United States Patent
Jahnke et al.

(10) Patent No.: US 10,541,434 B2
(45) Date of Patent: Jan. 21, 2020

(54) HEAT RECOVERY FOR SATURATOR WATER RECOVERY OF A DIRECT FUEL CELL SYSTEM

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 416 days.

(21) Appl. No.: 15/252,338

(22) Filed: Aug. 31, 2016

(65) Prior Publication Data

US 2018/0062186 A1     Mar. 1, 2018

(51) Int. Cl.
| | |
|---|---|
| H01M 8/04 | (2016.01) |
| H01M 8/04119 | (2016.01) |
| F28B 9/08 | (2006.01) |
| F25B 39/00 | (2006.01) |
| H01M 8/04291 | (2016.01) |
| F22B 1/18 | (2006.01) |
| H01M 8/0637 | (2016.01) |
| H01M 8/04014 | (2016.01) |

(Continued)

(52) U.S. Cl.
CPC ......... *H01M 8/04141* (2013.01); *B01B 1/005* (2013.01); *F01K 21/04* (2013.01); *F22B 1/18* (2013.01); *F25B 39/00* (2013.01); *F28B 9/08* (2013.01); *H01M 8/04014* (2013.01); *H01M 8/04029* (2013.01); *H01M 8/04164* (2013.01); *H01M 8/04291* (2013.01); *H01M 8/04835* (2013.01); *H01M 8/06* (2013.01); *H01M 8/0637* (2013.01); *H01M 2008/1293* (2013.01); *H01M 2008/147* (2013.01); *Y02E 60/526* (2013.01); *Y02E 60/566* (2013.01)

(58) Field of Classification Search
CPC ......... H01M 8/04141; H01M 8/04014; H01M 8/04164; H01M 8/04029; H01M 8/04835; H01M 8/04291; H01M 8/06; H01M 8/0637

See application file for complete search history.

(56) References Cited

U.S. PATENT DOCUMENTS

| | | | |
|---|---|---|---|
| 3,292,998 A * | 12/1966 | James | C01B 3/16 165/118 |
| 4,186,181 A | 1/1980 | Giammarco et al. | |

(Continued)

OTHER PUBLICATIONS

International Search Report and Written Opinion in PCT/2017/047528 dated Oct. 30, 2017(14 pages).

*Primary Examiner* — Helen Oi K Conley
(74) *Attorney, Agent, or Firm* — Foley & Lardner LLP

(57) ABSTRACT

A fuel cell system includes a fuel cell having an anode and a cathode, a water recovery system configured to recycle water from exhaust from the anode, a heat exchanger configured to transfer heat between exhaust from the cathode and water from the water recovery system, and a saturator having an upper section and a lower section separated by a divider defining an opening configured to allow fuel and steam to pass from the lower section to the upper section. The lower section receives fuel from a fuel source and water from the water recovery unit and the upper section receives fuel from the lower section and water from the heat exchanger.

18 Claims, 3 Drawing Sheets

(51) Int. Cl.
  *B01B 1/00*    (2006.01)
  *F01K 21/04*    (2006.01)
  *H01M 8/04029*   (2016.01)
  *H01M 8/04828*   (2016.01)
  *H01M 8/06*    (2016.01)
  *H01M 8/124*    (2016.01)
  *H01M 8/14*    (2006.01)

(56) References Cited

U.S. PATENT DOCUMENTS

| | | |
|---|---|---|
| 6,694,744 B1 | 2/2004 | Smith |
| 8,236,458 B2 | 8/2012 | Jahnke et al. |
| 8,367,256 B2 | 2/2013 | Jahnke et al. |
| 8,445,147 B2 | 5/2013 | Jahnke et al. |
| 8,815,462 B2 | 8/2014 | Ghezel-Ayagh et al. |
| 2009/0176134 A1* | 7/2009 | Jahnke .............. H01M 8/04164 429/413 |
| 2010/0216039 A1* | 8/2010 | Jahnke .................... F22B 1/18 429/413 |

* cited by examiner

HEAT RECOVERY FOR SATURATOR WATER RECOVERY OF A DIRECT FUEL CELL SYSTEM

BACKGROUND

The present application relates generally to fuel cell systems (e.g., molten carbonate or other high operating temperature fuel cell system), and more specifically to the field of heat recovery systems for use in such fuel cell systems.

Reactant gases supplied to fuel cells, and in particular, the reactant fuel gases supplied to the anodes of such fuel cells, must be sufficiently humidified (i.e., contain sufficient water) to maintain a desired steam-to-carbon ratio in the fuel for proper and efficient fuel cell operation, to provide sufficient ionic conductivity of the reactant gases, and to prevent carbon deposition (i.e., soot formation) in the fuel cell. The water used for the humidification is ordinarily preheated to a desired temperature, which requires energy.

It would be advantageous to provide an improved fuel cell system that more efficiently utilizes heated water for the humidification of reactant fuel gases to be input into the fuel cells. It would also be advantageous to utilize waste heat generated by various components of the fuel cell system. As will be appreciated by those reviewing the present disclosure, these and other advantages may be obtained using the exemplary embodiments disclosed herein.

SUMMARY

An exemplary embodiment relates to a fuel cell system including a fuel cell having an anode and a cathode, a water recovery system configured to recycle water from exhaust from the anode, a heat exchanger configured to transfer heat between exhaust from the cathode and water from the water recovery system, and a saturator having an upper section and a lower section separated by a divider defining an opening configured to allow fuel and steam to pass from the lower section to the upper section. The lower section receives fuel from a fuel source and water from the water recovery unit and the upper section receives fuel from the lower section and water from the heat exchanger.

Another exemplary embodiment relates to a saturator for a fuel cell system including a lower section defining an upper portion and a lower portion, the lower portion configured to receive fuel from a fuel source and the upper portion configured to receive water from a water recovery unit. The saturator further includes an upper section defining an upper portion and a lower portion, the upper portion configured to receive water from a heat exchanger and the lower portion configured to receive fuel from the lower section. The saturator further includes a divider separating the upper section and the lower section, the divider defining an opening configured to allow fuel and steam to pass from the lower section to the upper section.

Another exemplary embodiment relates to a method of saturating fuel for a fuel cell system including providing first and second portions of water from a water recovery unit, receiving the first portion of water and fuel in a lower section of a saturator, and outputting a partially-humidified fuel from the lower section. The method further includes heating the second portion of water in an exhaust heat exchanger, receiving the second portion of water and the partially-humidified fuel in an upper section of the saturator, and outputting a fully-humidified fuel from the upper section.

DETAILED DESCRIPTION

According to an exemplary embodiment, a fuel cell system is disclosed herein that utilizes low level heat recovered directly from a direct contact cooling tower ("DCCT"). A saturator configured to provide heated water for humidification of the reactant gases to be input into the fuel cells may be divided into two sections, and in the lower section, the fuel to the system is partially saturated using the heat from the DCCT. Hot water from the bottom of the DCCT is routed to the bottom section of the saturator. The partially-saturated fuel from the lower section of the saturator is then fully saturated to the desired level in the upper section. Hotter water is then fed to the upper section after it is preheated using heat from the system's cathode exhaust. By pre-saturating the gas in the lower section of the saturator, less heat is required in the cathode exhaust-water heat exchanger such that the heat becomes available for use for other purposes (e.g., reducing the supplemental fuel use).

This arrangement is applicable to all Direct Fuel Cell ("DFC") designs that include water recovery, since it allows the waste heat generated by other components of the fuel cell system to be used for other purposes. For example, it is particularly useful in designs which export hydrogen, syngas, or high pressure steam from the system or in dual-stack high efficiency fuel cell systems, each of which may typically require additional heat to be applied, since much of the anode exhaust is exported, reducing the amount of heat generated in an anode gas oxidizer ("AGO") 118.

Figure 1:
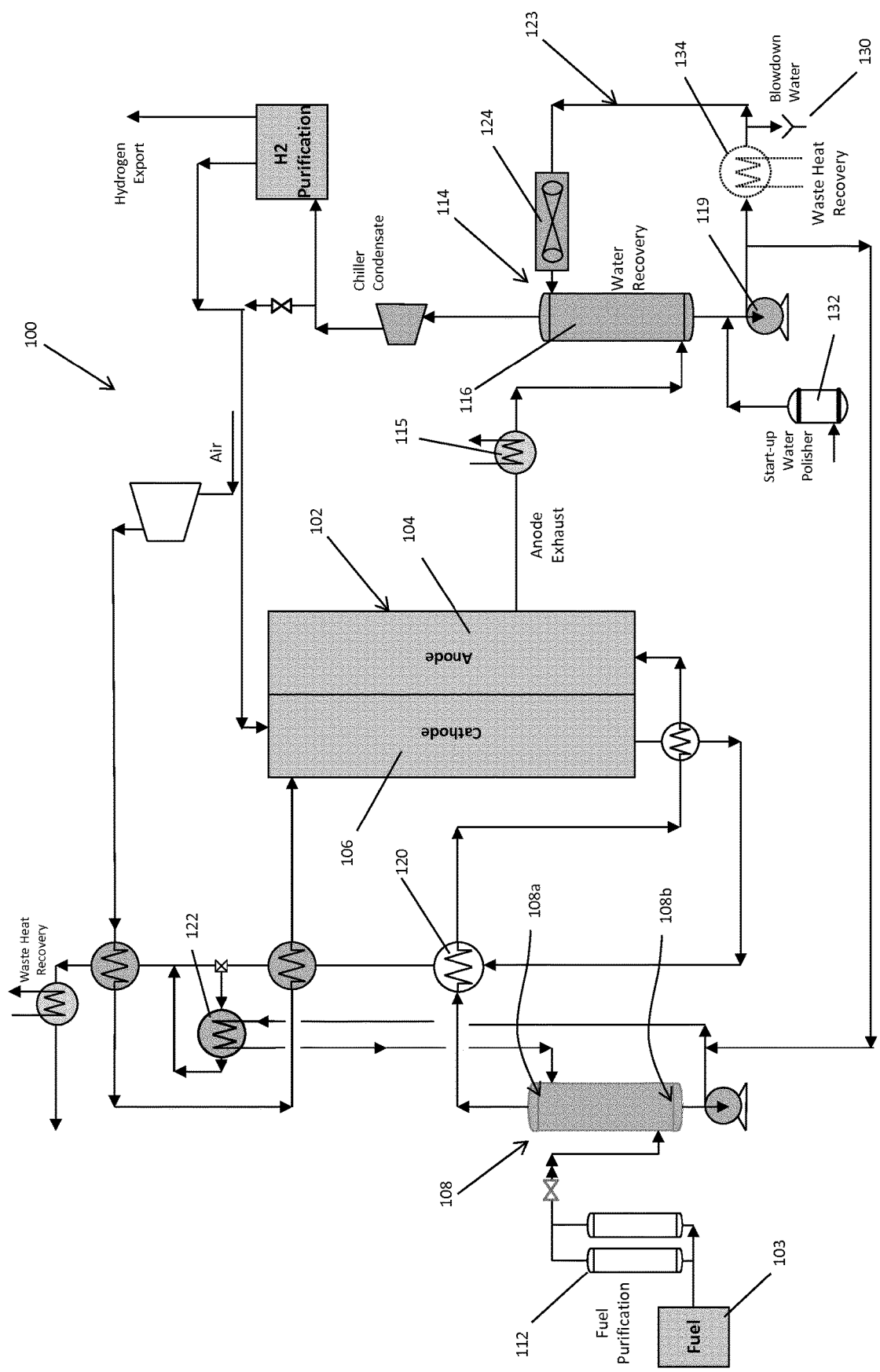
FIG. 1 shows a schematic view of a direct fuel cell system with a single-stage saturator.
Figure 2:
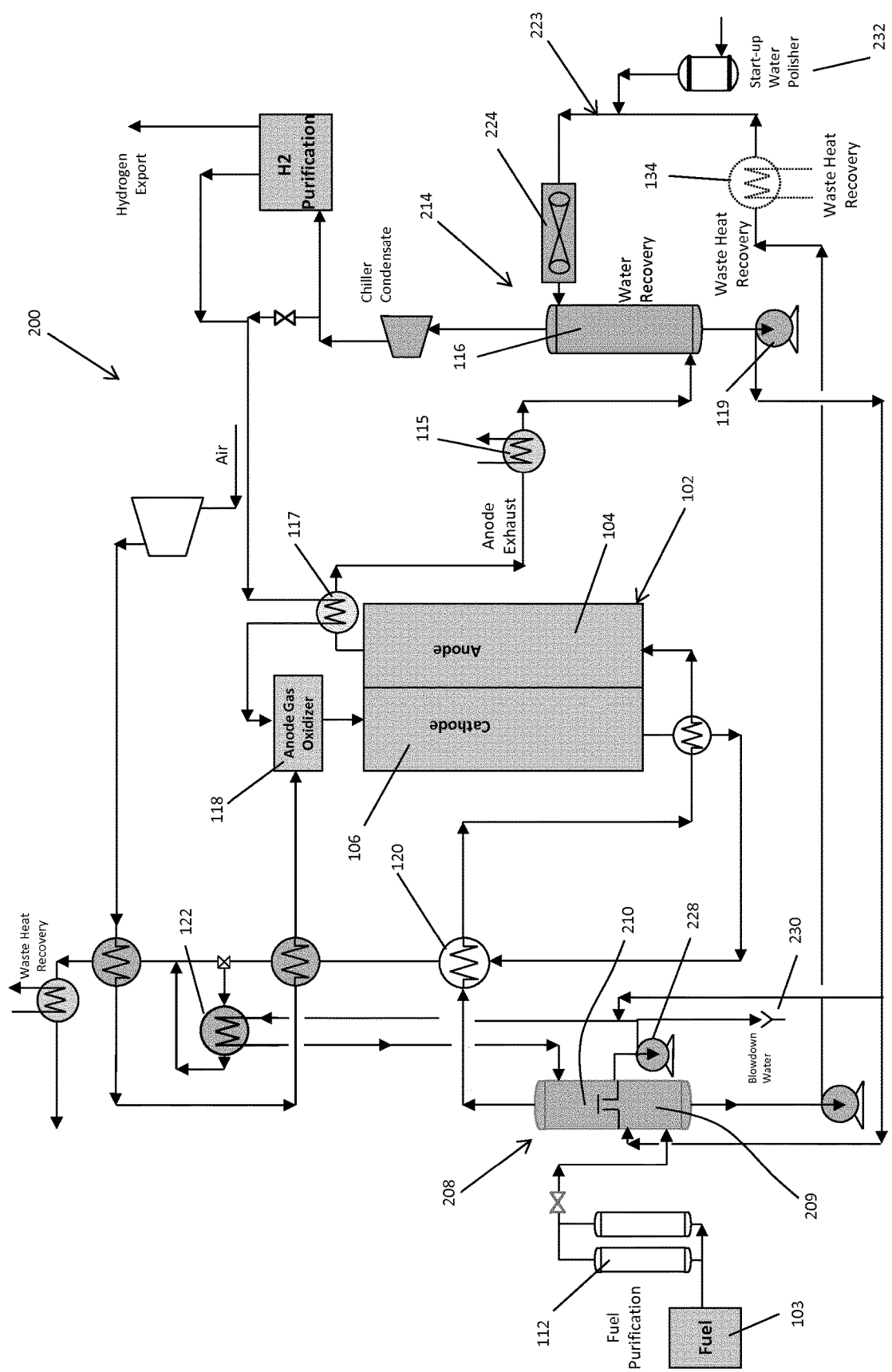
FIG. 2 shows a schematic view of an improved direct fuel cell system with a two-stage saturator.

FIG. 1 shows a fuel cell system 100 according to a first exemplary embodiment, and FIG. 2 illustrates an improved fuel cell system that includes the advantageous heat recovery system that is the subject of the present application. FIG. 1 will be described below to provide a description of the configuration and operation of the overall fuel cell system, followed by a discussion of the improved version shown in FIG. 2.

The fuel cell system 100 includes a fuel cell stack (i.e., fuel cell) 102 including an anode side 104 that is configured to receive fuel from a fuel supply 103 and to output anode exhaust. The fuel cell stack 102 also includes a cathode side 106 that is configured to receive oxidant gas and to output cathode exhaust. The fuel cell system 100 further includes a saturator 108 for heating and humidifying the fuel from the fuel supply 103 with water from a water recovery unit 114. A hydrocarbon-containing fuel (e.g., natural gas, propane, etc.) is supplied from the fuel supply 103. The fuel is processed in a desulfurizer 112 for removal of sulfur-containing compounds present in the fuel. The desulfurizer 112 includes one or more sulfur-adsorbent or sulfur-absorbent beds through which the fuel flows and which adsorb or absorb any sulfur-containing compounds in the fuel.

After passing through the desulfurizer 112, the fuel is received by the saturator 108, which is also configured to receive water from the water recovery unit 114. According to an exemplary embodiment, water may be supplied to the water recovery unit 114 from anode and/or cathode exhaust from the fuel cell stack 102, and/or from an external source (e.g., tap water). According to another exemplary embodiment, water may be provided by a start-up water polisher 132, as discussed in further detail below.

As shown in FIG. 1, the water recovery unit 114 includes a DCCT 116. The DCCT 116 is configured to receive the anode exhaust and to condense at least a portion of the water in the anode exhaust. According to an exemplary embodiment, the anode exhaust may be cooled by a first heat exchanger 115 before being received in the DCCT 116. As shown in FIG. 2, the anode exhaust may be cooled by a second heat exchanger 117, transferring heat from the anode exhaust to purified hydrogen, generating a heated hydrogen stream. The heated hydrogen stream may then be received in the AGO 118 and mixed (i.e., combusted) with air and fed to the cathode 106. Referring to FIG. 1, the anode exhaust is conveyed from the anode side 104 of the fuel stack 102 to one end of the DCCT 116, while cooled recycled water is conveyed to an opposing end of the DCCT 116 from a water recycle path 123, such that the anode exhaust and the cooled recycled water flow in opposing directions relative to one another. In the DCCT 116, the anode exhaust is cooled by direct contact with the recycled water, condensing at least a portion of the water in the anode exhaust. The water condensed from the anode exhaust is mixed with the recycled water as it travels through the DCCT 116. Hot condensed water comprising a mixture of the recycled water and the water condensed from the anode exhaust is collected at the bottom of the DCCT 116.

As shown in FIG. 1, a first portion of the condensed water collected at the bottom of the DCCT 116 is conveyed to the water recycle path 123, where it is cooled using a heat exchanger 124 (e.g., an airfan) for use as recycled water in the DCCT 116, while a second portion of the condensed water is output from the water recovery unit 114 and may be sent (i.e., recycled) to the saturator 108 for humidifying the fuel.

Cathode exhaust passes from the cathode side 106 of the fuel cell stack 102 through a first exhaust heat exchanger 120, configured to transfer heat from the cathode exhaust to humidified fuel (i.e., saturated gas) output from the saturator 108 to superheat the humidified fuel. The heated humidified fuel is then fed to the anode side 104 of the fuel cell stack 102. Fuel entering the anode side 104 is reformed therein to produce hydrogen and CO and undergoes an electrochemical reaction with oxidant gas passing through the cathode side 106 to form water and $CO_2$ as the fuel cell system 100 produces electrical power. The anode exhaust includes unreacted fuel, including hydrogen and CO, reaction products, including water vapor and $CO_2$, and small amounts of other compounds or gases.

After heating the humidified fuel, the cathode exhaust passes through a second exhaust heat exchanger 122, configured to transfer heat from the cathode exhaust to water from the DCCT 116. Accordingly, the second exhaust heat exchanger 122 further pre-heats the water from the DCCT 116 and recycles the water from the saturator 108 before the combined water is fed to the saturator 108. According to an exemplary embodiment, the hot water is generated by the second exhaust heat exchanger 122 transferring heat from the cathode exhaust, which in a typical situation may be heated to a temperature of about 240° F.

According to an exemplary embodiment, the water is provided to the saturator 108 near a top portion 108a thereof and flows in a downward direction through the saturator 108, while the fuel is provided near a bottom portion 108b of the saturator 108 and flows in an upward direction through the saturator 108. In the saturator 108, the fuel comes in direct contact with the water, and as a result, a first portion of the water is evaporated into the fuel, saturating the fuel with water vapor and producing humidified fuel. A second portion (i.e., the remaining portion), of the water in the saturator 108, which is not yet evaporated into the fuel, is output from the saturator 108 and combined with the water from the DCCT 116. The combination of unevaporated water and water from the DCCT 116 is sent through the second exhaust heat exchanger 122 and provided to the top portion 108a of the saturator 108. According to an exemplary embodiment, water may be supplied from the water recovery unit 114 to replace water in the saturator 108 as it is evaporated to form humidified fuel and output from the saturator 108. Excess water from the water recovery unit 114 may be discarded from the system as blowdown water through a water blowdown stream 130. According to an exemplary embodiment, the fuel cell system 100 is configured to remove (i.e., strip out) substantially all of the $CO_2$ in the recovered water. This process results in an increase in the pH level of the recovered water, simplifying the process of disposing of excess water from the fuel cell system 100 (e.g., the recovered water is at a pH level suitable for introduction to the environment without further processing).

Figure 3:
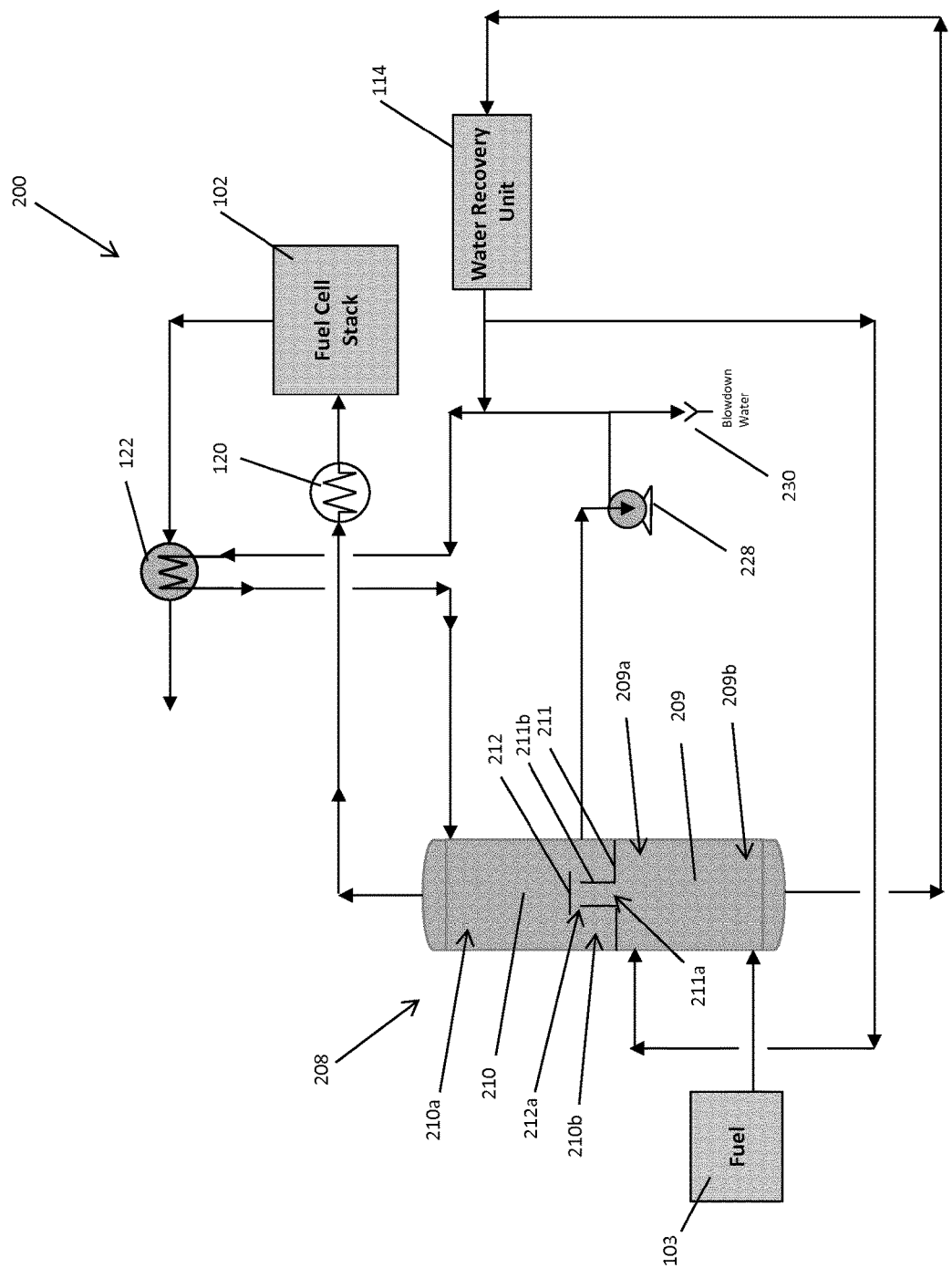
FIG. 3 shows a simplified schematic view of the direct fuel cell system of FIG. 2, according to an exemplary embodiment.

Referring now to FIGS. 2 and 3, a schematic view of a fuel cell system 200 with a two-stage saturator 208 is shown. According to an exemplary embodiment, a two-stage saturator 208 includes a vessel defining a lower (i.e., first) section 209 and an upper (i.e., second) section 210, partially separated by a divider (i.e., trap pan) 211 that is configured to allow humidified fuel to pass therethrough. According to an exemplary embodiment, substantially all of the water collected at the bottom of the DCCT 116 is conveyed to the saturator 208. According to other exemplary embodiments, only a portion of such water may be used.

As shown in FIG. 2, a first portion of the water is conveyed from the DCCT 116 to the lower section 209 of the saturator 208. A second portion of the water is conveyed from the DCCT 116 to the second exhaust heat exchanger 122 to be preheated by the cathode exhaust. The second portion of the water is then output from the second exhaust heat exchanger 122 and routed to the upper section 210 of the saturator 210.

According to an exemplary embodiment, the water received directly from the DCCT 116 (i.e., without first passing through the second exhaust heat exchanger 122), is provided to the saturator 208 near a top portion 209a of the lower section 209 of the saturator 208 and flows in a downward direction through the lower section 209, while the fuel is provided near a bottom (i.e., lower) portion 209b of the lower section 209 of the saturator 208 and flows in an upward direction through the lower section 209. In the lower section 209 of the saturator 208, the fuel comes in direct contact with the water, and as a result, a first portion of the water in the lower section 209 is evaporated into the fuel, saturating the fuel with water vapor and producing partially-humidified fuel. A second portion (i.e., the remaining portion), of the water in the lower section 209, which is not yet evaporated into the fuel, is output from the lower section 209 and returned to a water recycle path 223.

As shown in FIG. 3, the fuel is at least partially humidified in the lower section 209 and then passes through an opening 211a in the divider 211 configured to allow fuel (but not unevaporated water) to pass therethrough. For example, the opening 211a may be a hole in the divider 211 having an outer periphery defining a diameter and a surface area. According to other exemplary embodiments, the opening 211a may define other shapes. Gravity forces unevaporated water in the lower section 209 to fall downward, away from the opening 211a, whereas fuel (e.g., in gas form) and steam forming a partially-humidified fuel moves upward, passing through the opening 211. The partially-humidified fuel is output from an outlet 212a into the upper section 210. The divider 211 defines a wall or walls 211b extending generally upward from the outer periphery of the opening 211a. A cover 212 is disposed above the opening 211a and defines the outlet or outlets 212a therebetween. For example, the outlet 212a may be defined between the cover 212 and a top end of the wall 211b. According to an exemplary embodiment, the cover 212 extends beyond the outer periphery of the opening 211a (i.e., has a larger diameter and/or a larger surface area) and is configured to prevent water in the upper section 210 from passing through the opening 211a. According to another exemplary embodiment, the outlet 212a is positioned above the divider 211 such that the cover 212 is configured to prevent water flowing downward in the upper section 210 through the outlet 212a. For example, water may pool up on top of the divider 211 to the height of the walls 211b before entering the outlet 212a and flowing through the opening 211a into the lower section 209. According to another exemplary embodiment, the divider 211 includes a plurality of openings 211a, each configured the same as the opening 211a described above. According to another exemplary embodiment, the lower section 209 and upper section 210 may be located in separate (i.e., first and second, respectively) vessels. In this configuration, partially-humidified fuel is output from the top portion 209a of the lower section 209 and routed between the first and second vessels to the bottom portion 210b of the upper section 210.

Referring again to FIGS. 2 and 3, the second portion of water from the DCCT 116, which is fed through the second exhaust heat exchanger 122 (without first passing through the saturator 208), is provided to the saturator 208 near a top (i.e., upper) portion 210a of the upper section 210 of the saturator 208 and flows in a downward direction through the upper section 210, while the humidified fuel from the lower section 209 is provided near a bottom (i.e., lower) portion 210b of the upper section 210 of the saturator 208 after passing through the divider 211, and flows in an upward direction through the upper section 210. The water received in the top portion 210a of the upper section 210 of the saturator may be hotter than the water received in the top portion 109a of the lower section 209 of the saturator 208. According to an exemplary embodiment, the second portion of water from the DCCT 116 may be fed directly to the upper section 210 of the saturator 208. In the upper section 210 of the saturator 208, the humidified fuel comes in direct contact with the water from the second exhaust heat exchanger 122, and as a result, at least some of the second portion of the water in the upper section 210 is evaporated into the fuel, further saturating the fuel with water vapor and producing further-humidified fuel. Any remaining unevaporated water in the upper section 210, which is not yet evaporated into the humidified fuel, is output from the upper section 210 and may be combined with the hot water from the DCCT 116. At least a portion of the combined unevaporated water and water directly from the DCCT 116 is passed back through the second exhaust heat exchanger 122 and provided to the top (i.e., upper) portion 209a of the upper section 209 of the saturator 208. Any water not sent through the second exhaust heat exchanger 122 may be removed from the fuel cell system 200 through a blowdown stream 230, described in further detail below.

By pre-saturating (i.e., pre-humidifying) the fuel in the lower section 209 of the saturator 208 prior to passing the water from the DCCT 116 through the second exhaust heat exchanger 122, the partially-humidified fuel in the upper section 210 of the saturator 208 requires less water to be further (i.e., fully) humidified. Specifically, this means that water being passed through the second exhaust heat exchanger 122 requires less heat to be transferred from the cathode exhaust to the water in order to provide a sufficient amount of evaporated water to further (e.g., fully) humidify the fuel. Accordingly, the heat generated by the cathode exhaust may be reallocated to other locations within or outside of the fuel cell system 200.

According to an exemplary embodiment, any unevaporated water in the upper section 210 is output from the upper section 210 of the saturator 208 at a location above the divider 211 and below the outlet 212a. Accordingly, the divider 211 is configured to prevent backflow of unevaporated water from the upper section 210 into the lower section 209 of the saturator 208. According to another exemplary embodiment, water may be supplied from the water recovery unit 114 to replace water in the saturator 208 as it is evaporated to form humidified fuel and output from the saturator 208.

According to an exemplary embodiment, when excess unevaporated water output from the upper section 209 exceeds a specified amount, the excess water may be output through the water blowdown stream 230 and removed from the fuel cell system 200. The unevaporated water is passed from the saturator 208 to a circulation pump 228, which recycles the water to the second exhaust heat exchanger 122. As shown in FIG. 2, before being passed to the second exhaust heat exchanger 122, the second portion of water may be treated using a water blowdown technique to prevent accumulation of any non-volatile contaminants or dissolved solids dissolved in the water. According to an exemplary embodiment, the amount of water removed with the water blowdown stream 230 corresponds to the excess water condensed in the DCCT 116 above the amount needed for humidification. According to an exemplary embodiment, the excess water in the water blowdown stream 230 may be sent off site (e.g., through a drain) or stored (e.g., in a tank) for use during start-up of the fuel cell system 200 when the water produced in the fuel cell stack 102 and condensed in the water recovery system 214 is insufficient to humidify the fuel in the fuel cell system 200. According to another exemplary embodiment, make-up water from an external source (e.g., tap) may be used during start-up to provide at least a portion of a sufficient amount of water for humidification.

A steam-to-carbon ratio of about 1.9 may be desired for humidified fuel being introduced to the anode 104 of the fuel cell stack 102. According to an exemplary embodiment, between 2.00 and 2.20 million BTUs of heat, and typically between 2.05 and 2.10 million BTUs, are required to achieve the ratio of 1.9. In the fuel cell system 100 with a single-stage saturator 108, most or all of the required heat must come from the cathode exhaust through the second exhaust heat exchanger 122. In the fuel cell system 200 with a two-stage saturator 208, the water from the DCCT 116 provides around 0.8 million BTUs of heat to the lower section 209 of the saturator 208, resulting in a steam-to-carbon ratio of about 0.8 for the partially-humidified fuel introduced to the upper section 210 of the saturator 208.

Accordingly, the partially-humidified fuel requires less heat to be transferred from the cathode exhaust to the upper section 210 in order to complete the saturation process to achieve a ratio of 1.9. According to an exemplary embodiment, the heat provided from the cathode exhaust may be reduced by over 45% relative to a fuel cell system 100 having a single-stage saturator 108.

Further, in FIG. 1, the water output from the DCCT 116 has a high heat level from the anode exhaust. As the water passes through the water recycle path 123, the heat exchanger 124 must be large enough to remove a sufficient amount of heat from the water before the water is reintroduced to the DCCT 116. Referring now to FIG. 2, the heat exchanger 224 operates in a similar way to the heat exchanger 124. However, before the water output from the DCCT 116 is passed through the water recycle path 223 and into the heat exchanger 224, it is passed through the lower section 209 of the two-stage saturator 208. The pre-saturating process in the lower section 209 transfers heat from the water to the fuel, such that the water returning from the saturator 208 to the water recycle path 223 is cooler, after having around 0.8 million BTUs of heat removed. Because more heat is drawn out of the water through the two-stage saturator 208 than with a single-stage saturator 108, less heat must be removed by the heat exchanger 224 before feeding the recycled water back to the DCCT 116. Accordingly, the size and/or capacity of the heat exchanger 224 (e.g., air fan) may be reduced in the embodiment shown in FIG. 2, which may further reduce the operating and manufacturing costs of the fuel cell system 200.

As shown in FIGS. 1 and 2, the water recovery unit 114 may further include a start-up water polisher 132, 232 and a waste heat recovery heat exchanger 134. Water for humidifying the fuel may first be introduced to the fuel cell system 100, 200 at the water recovery unit 114, 214. The start-up water polisher 132, 232 may be configured to receive water from a traditional tap water source or any other source and remove contaminants and solids therefrom. According to an exemplary embodiment, as shown in FIG. 1, the start-up water may be introduced to the water recovery unit 114 downstream from the DCCT 116 but upstream from a DCCT water circulation pump 119 to provide water, in part, directly to the saturator 108, without first passing through the water recycle path 123, such that make-up water may be introduced at a lower pressure than required at an outlet of the DCCT water circulation pump 119. As shown in FIG. 2, the start-up water may be introduced to the water recovery unit 214 upstream from the heat exchanger 124 and DCCT 116, such that the water passes along the water recycle path 223 through each of the heat exchanger 124 and the DCCT 116 before being introduced to the saturator 208. According to other exemplary embodiments, the start-up water may be introduced to the water recovery unit 114, 214 at other locations. The start-up water may be introduced for a shortened period of time for beginning operation of the fuel cell system 100, 200 and then stopped. According to another exemplary embodiment, start-up water may be introduced to the water recovery unit 114, 214 after the fuel cell system 100, 200 has been in operation in order to increase the amount of water available in the fuel cell system 100, 200 or to replace water removed from the system in the blowdown stream 130, 230. Still referring to FIGS. 1 and 2, the water recovery unit 114 may further include a waste heat recovery exchanger 134. The waste heat recovery exchanger 134 may be placed anywhere along the water recycle path 123, 223 and is configured to transfer excess heat from water in the water recycle path 123, 223 to other locations within or outside of the fuel cell system 100, 200. According to another exemplary embodiment, start-up water may be sourced from a water tank filled from blowdown water generated during normal operation of the fuel cell system 100, 200 (e.g., when power is being produced). The blowdown of water to the tank may allow for the small amount of blowdown water to cool prior to discharge from the fuel cell system 100, 200 (e.g., to a sewer or other location). According to an exemplary embodiment, the blowdown water may be substantially pure with minor traces of electrolyte from the fuel cell stack 102.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, structures, shapes and proportions of the various elements, values of parameters, mounting arrangements, use of materials, orientations, processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A fuel cell system comprising:
a fuel cell having an anode and a cathode;
a water recovery system configured to recycle water from exhaust from the anode;
a heat exchanger configured to transfer heat between exhaust from the cathode and water from the water recovery system; and
a saturator comprising:
a lower section configured to receive fuel from a fuel source and water from the water recovery unit;
an upper section configured to receive fuel from the lower section and water from the heat exchanger; and
a divider separating the upper section and the lower section, the divider defining an opening configured to allow fuel and steam to pass from the lower section to the upper section;
wherein the lower section is configured to at least partially humidity the fuel from the fuel source;
wherein the lower section defines an upper portion and a lower portion, the lower portion configured to receive fuel from the fuel source and the upper portion configured to receive water from the water recovery unit; and
wherein the upper section defines an upper portion and a lower portion, the upper portion configured to receive water from the heat exchanger and the lower portion configured to receive fuel from the lower section.

2. The fuel cell system of claim 1, the divider further comprising:
at least one wall extending upward from the opening;
a cover disposed above the opening; and
an outlet defined between the cover and the at least one wall.

3. The fuel cell system of claim 1, the water recovery system further comprising a direct contact cooling tower configured to condense and separate water from the exhaust from the anode;
wherein substantially all of the water in the direct contact cooling tower is output to the saturator.

4. The fuel cell system of claim 1, wherein the water recovery system is configured to receive unevaporated water from the lower section.

5. The fuel cell system of claim 1, wherein the heat exchanger is configured to transfer heat between the exhaust from the cathode and unevaporated water output from the upper section.

6. The fuel cell system of claim 1, the divider further comprising:
at least one wall extending upward from the opening;
a cover disposed above the opening; and
an outlet defined between the cover and the at least one wall.

7. The fuel cell system of claim 1, wherein the upper section is configured to output unevaporated water from the lower portion of the upper section.

8. The fuel cell system of claim 7,
wherein the heat exchanger is configured to receive water from at least one of the upper section and the water recovery unit.

9. The fuel cell system of claim 1, further comprising a blowdown stream configured to output at least a portion of unevaporated water from the upper section.

10. The fuel cell system of claim 1, wherein the lower section is configured to partially humidify the fuel with a first portion of the water from the water recovery unit.

11. The fuel cell system of claim 10, wherein the upper section is configured to humidify partially-humidified fuel received from the lower section with a second portion of the water from the water recovery unit.

12. The fuel cell system of claim 11, wherein the heat exchanger is disposed downstream from the water recovery unit and upstream from the upper section of the saturator.

13. The fuel cell system of claim 12, wherein the heat exchanger is configured to heat the second portion of the water from the water recovery unit and output a heated second portion of the water to the upper section of the saturator.

14. The fuel cell system of claim 1, further comprising a blowdown stream configured to output at least a portion of unevaporated water from the upper section.

15. The fuel cell system of claim 1, wherein the lower section is configured to partially humidify the fuel with a first portion of the water from the water recovery unit.

16. The fuel cell system of claim 15, wherein the upper section is configured to humidify partially-humidified fuel received from the lower section with a second portion of the water from the water recovery unit.

17. The fuel cell system of claim 16, wherein the heat exchanger is disposed downstream from the water recovery unit and upstream from the upper section of the saturator.

18. The fuel cell system of claim 17, wherein the heat exchanger is configured to heat the second portion of the water from the water recovery unit and output a heated second portion of the water to the upper section of the saturator.

* * * * *

UNITED STATES PATENT AND TRADEMARK OFFICE
CERTIFICATE OF CORRECTION

PATENT NO. : 10,541,434 B2
APPLICATION NO. : 15/252338
DATED : January 21, 2020
INVENTOR(S) : Fred C. Jahnke and Matthew Lambrech Page 1 of 1

It is certified that error appears in the above-identified patent and that said Letters Patent is hereby corrected as shown below:

In the Claims

Claim 1:
Column 9, Line 6 delete "system" and insert -- unit --.
Column 9, Line 10 delete "system" and insert -- unit --.
Column 9, Line 22 delete "humidity" and insert -- humidify --.

Claim 3:
Column 9, Line 39 delete "system" and insert -- unit --.

Claim 4:
Column 9, Line 45 delete "system" and insert -- unit --.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*